United States Patent
Yu et al.

(10) Patent No.: US 11,705,758 B2
(45) Date of Patent: Jul. 18, 2023

(54) WIRELESS POWER TRANSMITTING TERMINAL AND CONTROL METHOD

(71) Applicant: NINGBO WEIE ELECTRONICS TECHNOLOGY LTD., Ningbo (CN)

(72) Inventors: Feng Yu, Ningbo (CN); Lizhi Xu, Ningbo (CN); Weiyi Feng, Ningbo (CN); Min Fu, Ningbo (CN)

(73) Assignee: Ningbo Weie Electronics Technology Ltd., Ningbo (CN)

( * ) Notice: Subject to any disclaimer, the term of this patent is extended or adjusted under 35 U.S.C. 154(b) by 0 days.

(21) Appl. No.: 17/487,841

(22) Filed: Sep. 28, 2021

(65) Prior Publication Data
US 2022/0115911 A1    Apr. 14, 2022

(30) Foreign Application Priority Data

Oct. 13, 2020  (CN) .................. 202011092940.X (51) Int. Cl.
*H02J 50/12*    (2016.01)
(52) U.S. Cl.
CPC ........... *H02J 50/12* (2016.02); *H02J 2310/58* (2020.01)
(58) Field of Classification Search
CPC .............................. H02J 50/12; H02J 2310/58
See application file for complete search history.

(56) References Cited

U.S. PATENT DOCUMENTS

| | | | | |
|---|---|---|---|---|
| 2016/0164307 A1* | 6/2016 | Shibata | ................... | H02J 50/12 307/104 |
| 2018/0337549 A1* | 11/2018 | Chen | ................... | H02J 50/12 |
| 2018/0351407 A1* | 12/2018 | Ogishima | ............ | H04B 5/0081 |
| 2020/0076245 A1* | 3/2020 | Jin | ................... | H02J 50/12 |
| 2022/0052558 A1* | 2/2022 | Nakao | ................... | H02M 3/01 |

FOREIGN PATENT DOCUMENTS

| | | |
|---|---|---|
| CN | 105186720 B | 12/2017 |
| CN | 107332360 B | 12/2019 |
| CN | 106961165 B | 2/2020 |

OTHER PUBLICATIONS

Ignacio Rintoul, Kinetic Control of Aqueous Polymerization Using Radicals Generated in Different Spin States, Mar. 24, 2017.*

* cited by examiner

*Primary Examiner* — Daniel Kessie
(74) *Attorney, Agent, or Firm* — Andrus Intellectual Property Law, LLC (57) ABSTRACT

A wireless power transmitting terminal and control method are disclosed. The wireless power transmitting terminal including an inverter circuit, a resonance circuit and a controller, wherein in a frequency detection state, an alternating current of the inverter circuit is controlled to switch between different candidate frequencies, so as to determine a resonance frequency and a maximum peak value of an electrical parameter of the alternating current at the resonance frequency, and determine an operating state of the power transmitting terminal according to the change of the maximum peak value. Therefore, the wireless power transmitting terminal can dynamically adjust in real time a preset operating state thereof, thereby improving the device adaptability, and avoiding the damage of the device to be charged.

11 Claims, 8 Drawing Sheets

WIRELESS POWER TRANSMITTING TERMINAL AND CONTROL METHOD

CLAIM OF PRIORITY AND CROSS-REFERENCE TO RELATED APPLICATION(S)

This application claims the benefit of Chinese Patent Application No. 202011092940.X, filed on Oct. 13, 2020, which is incorporated herein by reference in its entirety.

BACKGROUND OF THE INVENTION

1. Field of the Invention

The present invention relates to the technical field of wireless power transmitting, and particularly to a wireless power transmitting terminal and control method.

2. Description of the Related Art

A wireless power transfer apparatus generally includes a wireless power transmitting terminal and a power receiving terminal, wherein the power receiving terminal is generally built in a device to be charged; when in use, the power receiving terminal is placed in an alternating magnetic field generated by the power transmitting terminal to realize wireless charging.

The conventional wireless power transmitting terminal generally transmits power, in a power transmitting state, based on a preset specific initial magnetic field intensity, such that the device to be charged can be normally charged in a preset distance range. However, if the preset distance range is too small, then it can only meet the needs of a few adapted devices to be charged, and adjustment is performed subsequently according to an actual feedback signal. If the preset distance range is too large, then the requirement for long distance charging can be satisfied. However, when the device to be charged is close to the power transmitting terminal, the over-voltage protection circuit in the device would be easily triggered due to a too high induced voltage, and therefore the device cannot be continuously charged, or event be damaged.

BRIEF DESCRIPTION OF THE INVENTION

According to one aspect of the present disclosure, the present disclosure provides a wireless power transmitting terminal, wherein the wireless power transmitting terminal comprises an inverter circuit, a resonance circuit and a controller; the inverter circuit is configured to receive a direct current and output an alternating current; the resonance circuit is connected to the inverter circuit, receiving the alternating current outputted by the inverter circuit to generate an alternating magnetic field; the controller is configured to perform: in a frequency detection state, controlling the alternating current of the inverter circuit to switch between different candidate frequencies to determine a resonance frequency, wherein at the resonance frequency, an electrical parameter of the alternating current has a maximum peak value; and determining an operating state of the wireless power transmitting terminal according to the change of the maximum peak value.

According to another aspect of the present disclosure, the present disclosure provides a control method for controlling a wireless power transmitting terminal comprising an inverter circuit and a resonance circuit, wherein the method comprises: in a frequency detection state, controlling an alternating current of the inverter circuit to switch between different candidate frequencies to determine a resonance frequency, wherein at the resonance frequency, an electrical parameter of the alternating current has a maximum peak value; and determining an operating state of the wireless power transmitting terminal according to the change of the maximum peak value.

In accordance with the abovementioned wireless power transmitting terminal and control method, in the frequency detection state, the alternating current of the inverter circuit is controlled to switch between different candidate frequencies, so as to determine a resonance frequency and a maximum peak value of the electrical parameter of the alternating current at the resonance frequency, and determine an operating state of the power transmitting terminal according to the change of the maximum peak value, such that the wireless power transmitting terminal can dynamically adjust in real time the preset operating state thereof, thereby improving the device adaptability, and avoiding the damage of device to be charged.

BRIEF DESCRIPTION OF THE DRAWINGS

Through the following description of the embodiments of the present disclosure with reference to the drawings, the above and other objectives, features and advantages of the present disclosure will become more apparent, wherein:

FIG. 10$a$-10$d$ are schematic views of preset relation curves according to some embodiment of the present disclosure.

DETAILED DESCRIPTION OF EMBODIMENTS OF THE INVENTION

Several preferred embodiments of the present disclosure will be described in detail in conjunction with the accompanying drawings as follows, however, the present disclosure is intended to encompass any substitutions, modifications, equivalents, etc., made thereto without departing from the spirit and scope of the present disclosure. In order to provide those skilled in the art with thorough understanding of the present disclosure, particular details will be described below in the preferred embodiments of the present disclosure, although those skilled in the art can understand the present disclosure without the description of these details.

In addition, a person skilled in the art should understand that the drawings herein are provided for the purpose of description only, and are not necessarily drawn in proportion.

Furthermore, it should be understood that in the following descriptions, "circuit" refers to an electrical circuit formed by electrically connecting or electromagnetically connecting at least one element or sub-circuit. When one element or circuit is "connected to" another element or one element/circuit is "connected" between two nodes, the one element/circuit can be directly coupled or connected to another element or via an intermediate element, and the connection between the elements can be a physical connection, a logical connection or a combination thereof. On the contrary, when one element is "directly coupled to" or "directly connected to" another element, it means that no intermediate element is provided between the two elements.

Unless otherwise stated, the terms "comprise", "include" and the like in the specification shall be interpreted as inclusive rather than exclusive or exhaustive; in other words, the terms mean "include but not limited to".

In the descriptions of the present disclosure, it should be understood that the terms like "first", "second" and the like are used for the purpose of description only, but cannot be considered to indicate or imply relative importance. In addition, in the descriptions of the present disclosure, unless otherwise stated, the meaning of "a plurality of" is two or more.

Wireless charging technology is a wireless power transmission technology capable of realizing power transmission without a wire connection. The existing wireless power transmitting terminal generally charges a device to be charged on the basis of a preset initial magnetic field intensity, but can only meet the needs for charging the device to be charged in a preset distance range. When a distance between the device to be charged and the wireless power transmitting terminal exceeds a preset optimal distance range, the charging efficiency is low or the charging cannot continue. Therefore, the wireless power transmitting terminal has a poor adaptability to the device to be charged, and the normal use of the device to be charged would be affected. On such basis, some embodiments of the present disclosure provide a wireless power transmitting terminal and control method, such that the wireless power transmitting terminal can in real time dynamically adjust a preset operating state thereof, so as to improve the adaptability of the wireless power transmitting terminal to the device to be charged, and avoid the damage of the device to be charged.

In order to ensure the charging efficiency and charging stability in the process that the wireless power transmitting terminal charges the device to be charged, the frequencies of the wireless power transmitting terminal and the device to be charged need to be respectively detected before the wireless power transmitting terminal formally charges the device to be charged, so as to ensure that the operating frequencies of the wireless power transmitting terminal and the device to be charged are synchronous. Therefore, the problems of frequency interference and oscillation due to asynchronous frequencies during charging may be avoided, and the charging efficiency and stability during charging may be ensured. In addition, in the process of detecting the frequency of the wireless power transmitting terminal, when a frequency signal received by the wireless power transmitting terminal is close to or equal to an inherent frequency of the wireless power transmitting terminal, resonance will be generated, and the current, voltage or other electrical parameters of the wireless power transmitting terminal at the corresponding resonance frequency will also reach maximum peak values. When the device to be charged is placed in the range of an alternating magnetic field generated by the wireless power transmitting terminal, the frequency of the resonance generated by the wireless power transmitting terminal and the maximum peak values of the corresponding electrical parameters will also change. Therefore, in a frequency detection state, according to the resonance frequency of the wireless power transmitting terminal and the change of the maximum peak values of the corresponding electrical parameters at the resonance frequency, the operating state of the wireless power transmitting terminal may be controlled and adjusted thereby to improve the adaptability of the wireless power transmitting terminal to the device to be charged.

It should be understood that the device to be charged in the present embodiment may be any electronic devices which capable of wireless charging in the alternating magnetic field. The present embodiment is described by taking the device to be charged being a mobile phone as an example, but it does not limit the type of the device to be charged.

Figure 1:
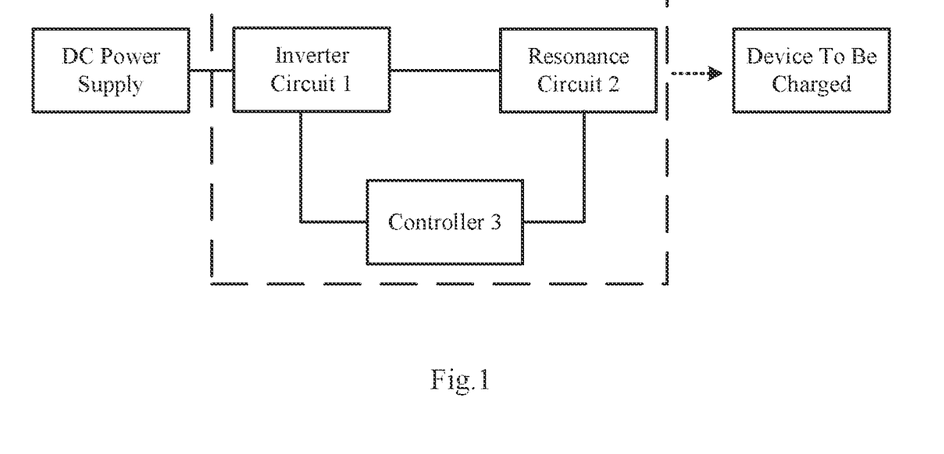
FIG. 1 is a schematic view of a wireless power transmitting terminal according to one embodiment of the present disclosure.

FIG. 1 is a schematic view of a wireless power transmitting terminal according to one embodiment of the present disclosure. As shown in FIG. 1, the wireless power transmitting terminal of the embodiment of the present disclosure includes an inverter circuit 1, a resonance circuit 2, and a controller 3, wherein the inverter circuit 1 is used to receive a direct current and output an alternating current; the resonance circuit 2 is connected to the inverter circuit 1, receives the alternating current outputted by the inverter circuit 1, and generates an alternating magnetic field. When the device to be charged is placed in the range of the alternating magnetic field, the device to be charged could be charged by means of the alternating magnetic field. The controller 3 is electrically connected to the inverter circuit 1 and the resonance circuit 2 to detect the frequency of the wireless power transmitting terminal, adjust an operating parameter of the inverter circuit 1 according to a frequency detection result, and then adjust the alternating magnetic field generated by the resonance circuit 2, so as to realize the charging the device to be charged in different use states.

In one optional embodiment, the inverter circuit of the present embodiment may be realized by switching on/off a semiconductor switching device (including a controllable silicon transistor, a power field effect transistor and the like). The resonance circuit may be realized by series resonance. The controller can adopt a programmable logic circuit, a single chip microcomputer, a digital signal processing module, or other circuits or chips having a signal processing function.

Figure 2:
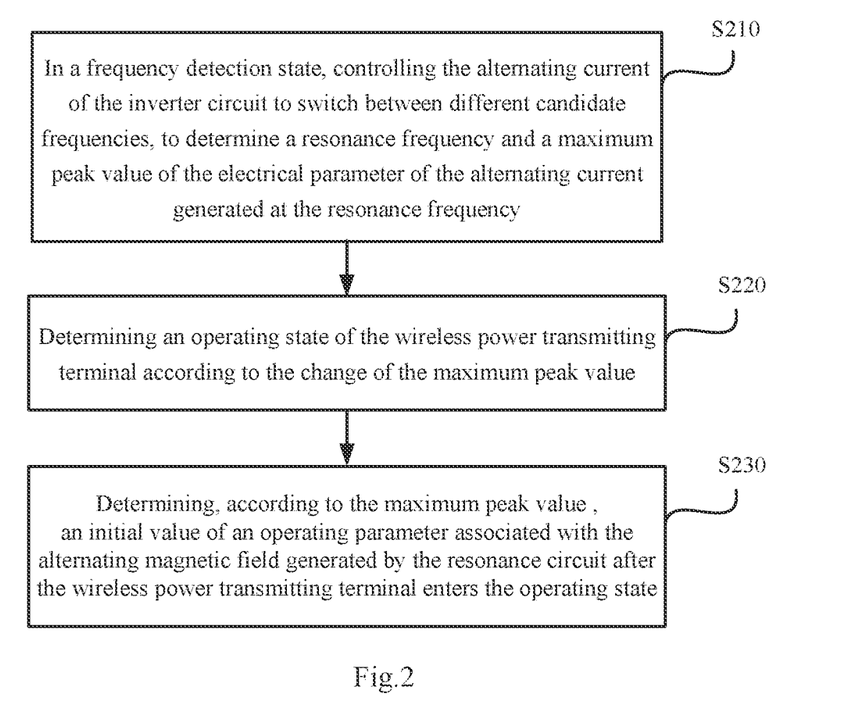
FIG. 2 is an operating flow chart of a controller according to one embodiment of the present disclosure.

FIG. 2 is an operating flow chart of a controller according to one embodiment of the present disclosure. As shown in FIG. 2, the controller of the present embodiment is configured to execute steps S210-S230.

In the step S210, in a frequency detection state, controlling the alternating current of the inverter circuit to switch between different candidate frequencies, to determine a resonance frequency and a maximum peak value of the electrical parameter of the alternating current generated at the resonance frequency.

In the present embodiment, in the frequency detection state, since the resonance circuit has an inherent frequency, when the detected frequency is close to or equal to the inherent frequency of the resonance circuit, the wireless power transmitting terminal would resonate with the detected frequency, and the electrical parameter of the alternating current generated at the corresponding resonance frequency has the maximum peak value.

In the step S220, determining an operating state of the wireless power transmitting terminal according to the change of the maximum peak value.

In the present embodiment, when an change of the electrical parameter of the alternating current generated by the wireless power transmitting terminal is detected, it means a device to be charged exists in the alternating magnetic field, and therefore the wireless power transmitting terminal could be controlled to enter the operating state; and when no change of the electrical parameter of the alternating current generated by the wireless power transmitting terminal is detected, it means no device to be charged exists in the alternating magnetic field, and therefore the wireless power transmitting terminal could be controlled to keep in the standby state. Therefore, whether the wireless power transmitting terminal enters the operating state is determined according to the change of the maximum peak value in the frequency detection state, such that the operating state of the wireless power transmitting terminal may be dynamically adjusted in real time. The adjustment mode may be simple and quick, and facilitating use. Furthermore, when a device to be charged exists in the alternating magnetic field, the device to be charged is charged; and when no device to be charged exists in the alternating magnetic field, the wireless power transmitting terminal keeps in the standby state, thereby reducing power consumption.

In the step S230, determining, according to the maximum peak value, an initial value of an operating parameter associated with the alternating magnetic field generated by the resonance circuit after the wireless power transmitting terminal enters the operating state.

In the present embodiment, when the electrical parameter of the alternating current generated by the wireless power transmitting terminal changes, the operating state of the inverter circuit is adjusted according to the maximum peak value of the changed electrical parameter, and then the initial value of the operating parameter associated with the alternating magnetic field generated by the resonance circuit could be determined. Thus, the alternating magnetic field generated by the wireless power transmitting terminal can adapt to the charging of the device to be charged in different states, performance and charging efficiency of the wireless power transmitting terminal may be improved, the universality of the wireless power transmitting terminal may be improved, and the power consumption of the wireless power transmitting terminal in the operating state may be reduced.

Figure 3:
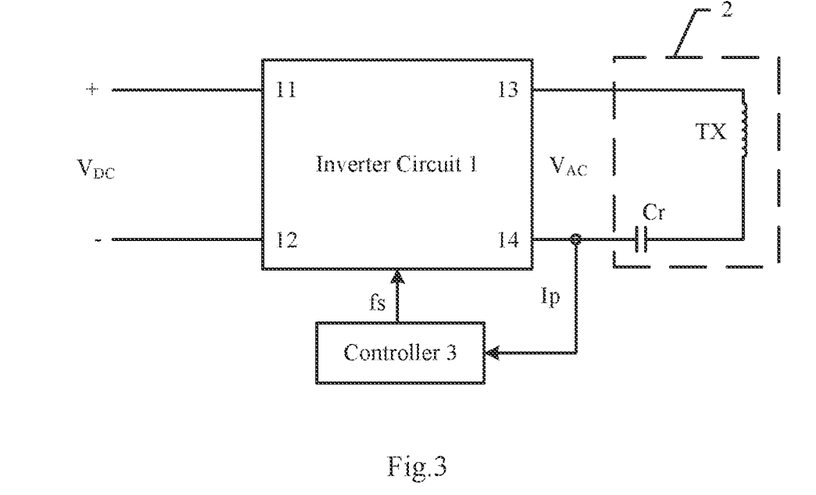
FIG. 3 is a circuit diagram of the wireless power transmitting terminal according to one embodiment of the present disclosure.

FIG. 3 is a circuit diagram of the wireless power transmitting terminal according to one embodiment of the present disclosure. As shown in FIG. 3, the inverter circuit 1 of the present embodiment includes a first input end 11, a second input end 12, a first output end 13, and a second output end 14, wherein the first input end 11 and the second input end 12 are respectively connected to a positive electrode and a negative electrode of a direct current power supply $V_{DC}$, and outputs an alternating voltage $V_{AC}$. The resonance circuit 2 includes a power transmitting coil TX and a compensation capacitor Cr which are connected in series, wherein two ends of the power transmitting coil TX are respectively connected to the first output end 13 and the compensation capacitor Cr; two electrodes of the compensation capacitor Cr are respectively connected to the power transmitting coil TX and the second output end 14. The power transmitting coil TX converts the alternating current generated by the inverter circuit 1 into an alternating magnetic field. The compensation capacitor Cr resonates with the power transmitting coil TX, to improve the power transmission efficiency. When the device to be charged is placed near the power transmitting coil TX or in the range of the alternating magnetic field, the power receiving coil in the device to be charged induces an alternating voltage; then, the rectification circuit in the device to be charged performs rectification, and the device to be charged may be charged.

In the present embodiment, owing to the existence of the power transmitting coil TX and the compensation capacitor Cr, the resonance circuit 2 has an inherent resonance frequency. In the frequency detection state, no device to be charged exists in the alternating magnetic field; the controller 3 outputs a sweep signal fs, and controls the alternating current generated by the inverter circuit 1 to switch between different candidate frequencies. When a candidate frequency gets close to or equal to the inherent frequency of the resonance circuit 2, the circuit generates resonance, the impedance of the power transmitting coil TX at the corresponding resonance frequency reaches a minimum value, and the relevant electrical parameter in the wireless power transmitting terminal reaches the maximum peak value.

In one optional embodiment, an alternating current Ip passing through the power transmitting coil TX is treated as the electrical parameter to monitor the operating state of the wireless power transmitting terminal, and an initial magnetic field intensity of the alternating magnetic field is treated as the operating parameter associated with the alternating magnetic field generated by the resonance circuit.

When no power receiving terminal exists in the alternating magnetic field, the alternating current passing through the power transmitting coil TX reaches the maximum peak value at the resonance frequency. When there is a device to be charged exists in the alternating magnetic field, the power receiving coil or a magnetic component built in the device to be charged would cause power loss, such that the power factor of the wireless power transmitting coil would be reduced, and the corresponding peak current of the alternating current excited at the resonance frequency would also be reduced. Therefore, by detecting the change of the maximum peak value of the alternating current passing through the power transmitting coil TX, whether the device to be charged exists in the alternating magnetic field generated by the wireless power transmitting terminal could be determined; and the operating state of the wireless power transmitting terminal could be determined according to whether the device to be charged exists in the alternating magnetic field.

In some embodiments, when the device to be charged is in the alternating magnetic field generated by the wireless power transmitting terminal, the wireless power transmitting terminal is controlled to enter the operating state to realize wirelessly charge for the device to be charged. When the device to be charged is not in the alternating magnetic field, the wireless power transmitting terminal is controlled to keep in the standby state to reduce the power consumption of the wireless power transmitting terminal.

Moreover, when the device to be charged exists in the range of the alternating magnetic field, the power receiving coil built in the device to be charged would cause power loss; the closer the power receiving coil to the power transmitting coil TX, the greater the loss is, and the more obvious the change of the peak current is. Therefore, by detecting the change degree of the maximum peak value of the alternating current passing through the power transmitting coil TX, the distance from the device to be charged to the power transmitting coil TX could be determined.

When the change degree of the peak current is small, it means that the power receiving terminal is distal from the power transmitting coil TX, and the wireless power transmitting terminal is controlled to generate a strong magnetic field to charge the device to be charged. When the change degree of the peak current is great, it means that the power receiving terminal is close to the power transmitting coil TX, and the wireless power transmitting terminal is controlled to generate a weak magnetic field to charge the device to be charged. Therefore, the initial magnetic field intensity of the alternating magnetic field generated by the wireless power transmitting terminal could be determined according to the changed alternating current passing through the power transmitting coil TX. Thus, the magnetic field intensity of the alternating magnetic field generated by the wireless power transmitting terminal can adapt to the charging of the devices to be charged at different distances, thereby avoiding the problem that the device to be charged cannot be charged or the charging efficiency is low when the distance between the device to be charged and the power transmitting coil exceeds a preset distance, and preventing the device to be charged from being damaged due to a too strong magnetic field when the distance between the device to be charged and the power transmitting coil is less than the preset distance.

Figure 4:
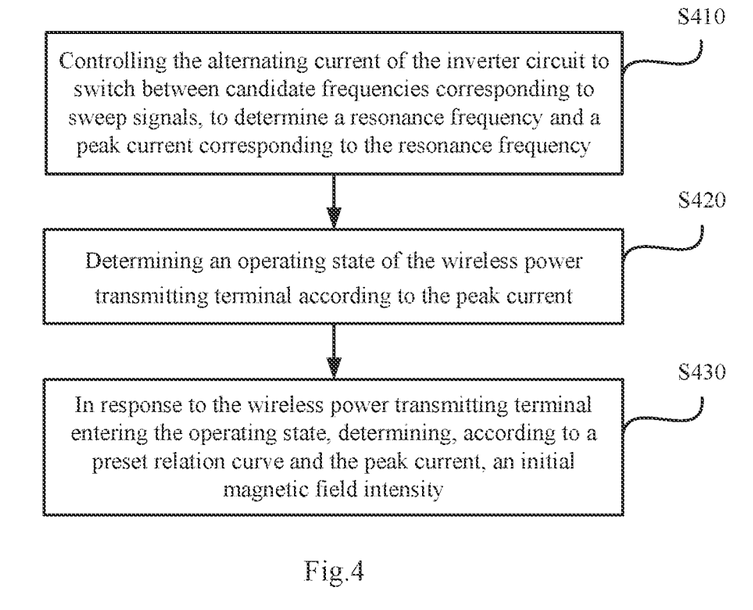
FIG. 4 is a flow chart illustrating steps executed by the controller according to one embodiment of the present disclosure.

FIG. 4 is a flow chart illustrating steps executed by the controller according to one embodiment of the present disclosure. On the basis of the above content, as shown in FIG. 4, the controller of the present embodiment is configured to execute steps S410-S430.

In the step S410, controlling the alternating current of the inverter circuit to switch between candidate frequencies corresponding to sweep signals, to determine a resonance frequency and a peak current corresponding to the resonance frequency.

The controller of the present embodiment outputs the sweep signal fs; the sweep signal fs includes candidate frequency signals the frequencies of which sequentially progressively increase. In the frequency detection state, the controller controls the alternating current of the inverter circuit to switch between different candidate frequencies, determines a corresponding frequency when the resonance circuit resonates to be the resonance frequency, and determines a corresponding current passing through the power transmitting coil TX at the resonance frequency to be the peak current.

In the step S420, determining an operating state of the wireless power transmitting terminal according to the peak current.

Figure 5:
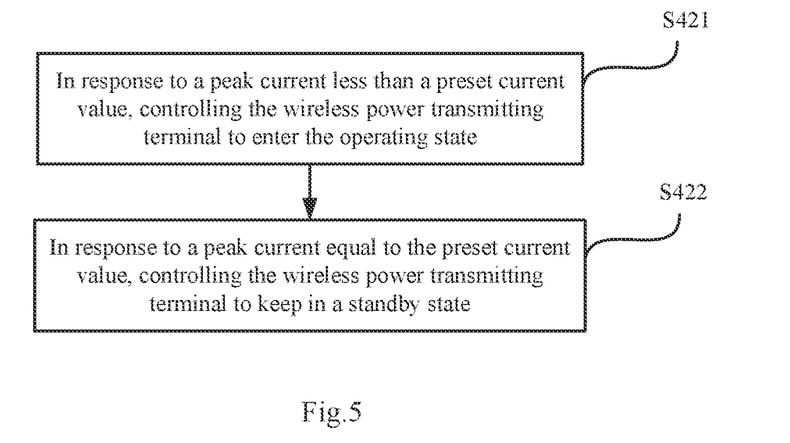
FIG. 5 is a flow chart of determining an operating state of the wireless power transmitting terminal according to one embodiment of the present disclosure.

In one optional embodiment, FIG. 5 is a flow chart of determining an operating state of the wireless power transmitting terminal according to one embodiment of the present disclosure. As shown in FIG. 5, in the solution of the present embodiment, when determining the operating state of the wireless power transmitting terminal, the controller is further configured to execute step S421 and step S422.

In the step S421, in response to a peak current less than a preset current value, controlling the wireless power transmitting terminal to enter the operating state.

In the present embodiment, when the peak current is less than the preset current value, it means that the device to be charged exists in the alternating magnetic field, and therefore the wireless power transmitting terminal is controlled to enter the operating state.

In the step S422, in response to a peak current equal to the preset current value, controlling the wireless power transmitting terminal to keep in a standby state.

In the present embodiment, when the peak current is equal to the preset current value, it means that no device to be charged exists in the alternating magnetic field, and therefore the wireless power transmitting terminal is controlled to keep in the standby state.

Optionally, in the present embodiment, the preset current value, when no device to be charged exists in the range of the alternating magnetic field, is the maximum peak value of the alternating current of the inverter circuit corresponding to the resonance frequency in the frequency detection state. Therefore, according to the relationship between the peak current and the maximum peak current at the resonance frequency, whether the device to be charged exists in the alternating magnetic field generated by the inverter circuit could be determined; and when the device to be charged exists in the alternating magnetic field, the wireless power transmitting terminal is controlled to enter the operating state to charge the device to be charged.

Optionally, in the present embodiment, when the wireless power transmitting terminal is in the standby state, the controller controls the inverter circuit to periodically perform frequency detection, so as to ensure that when the device to be charged gets close to the power transmitting coil, the power transmitting coil can generate an alternating magnetic field in time for charging, thereby improving the use performance of the wireless power transmitting terminal.

Figure 6:
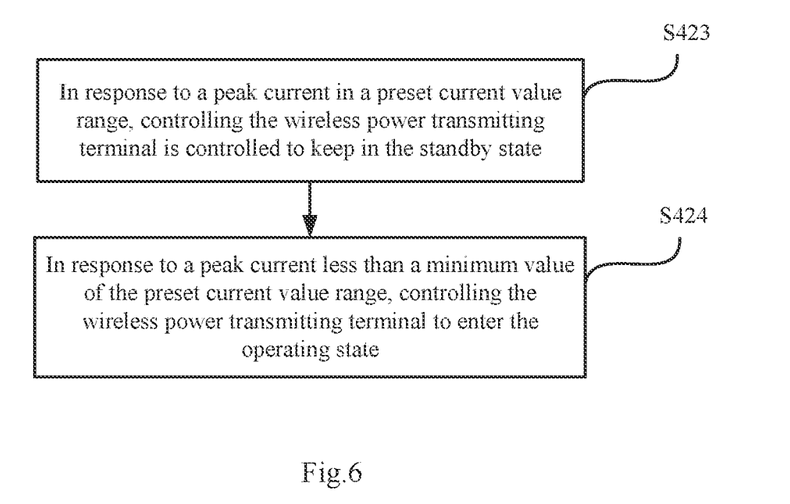
FIG. 6 is another flow chart of determining the operating state of the wireless power transmitting terminal according to one embodiment of the present disclosure.

In another optional embodiment, FIG. 6 is another flow chart of determining an operating state of the wireless power transmitting terminal according to one embodiment of the present disclosure. As shown in FIG. 6, in the solution of the present embodiment, when determining the operating state of the wireless power transmitting terminal, the controller is configured to execute steps S423-S424.

In the step S423, in response to a peak current in a preset current value range, controlling the wireless power transmitting terminal is controlled to keep in the standby state.

In the step S424, in response to a peak current less than a minimum value of the preset current value range, controlling the wireless power transmitting terminal to enter the operating state.

In the present embodiment, the preset current value range, when no power receiving terminal exists in the range of the alternating magnetic field, includes the maximum peak value of the alternating current of the inverter circuit corresponding to the resonance frequency in the frequency detection state. Therefore, according to the relationship between the peak current and the preset current value range, the operating state of the wireless power transmitting terminal could be determined, such that the operating state of the wireless power transmitting terminal may be determined more flexibly and conveniently.

Optionally, in the present embodiment, the operating state of the wireless power transmitting terminal is determined according to the relationship between the peak value of the alternating current of the inverter circuit and a maximum peak value thereof, wherein the maximum peak value is: when there is no device to be charged exists in the range of the alternating magnetic field, in the frequency detection state, the peak value corresponding to the resonance frequency. After the wireless power transmitting terminal enters the operating state, in order to further improve the adaptability of the wireless power transmitting terminal to the device to be charged, the controller of the present embodiment is further configured to execute step S430.

In the step S430, in response to the wireless power transmitting terminal entering the operating state, determining, according to a preset relation curve and the peak current, an initial magnetic field intensity.

In the present embodiment, the preset relation curve is a relation curve, obtained under a test condition, between the peak current passing through the power transmitting coil and the initial magnetic field intensity of the wireless power transmitting terminal. Therefore, the initial magnetic field intensity is determined according to the preset relation curve, such that the alternating magnetic field generated by the wireless power transmitting terminal may better satisfy a charging requirement. It may facilitate the improvement of control accuracy of the alternating magnetic field, and improve the charging efficiency of the device to be charged.

To facilitate understanding, the present disclosure is described below with reference to specific examples.

Figure 7:
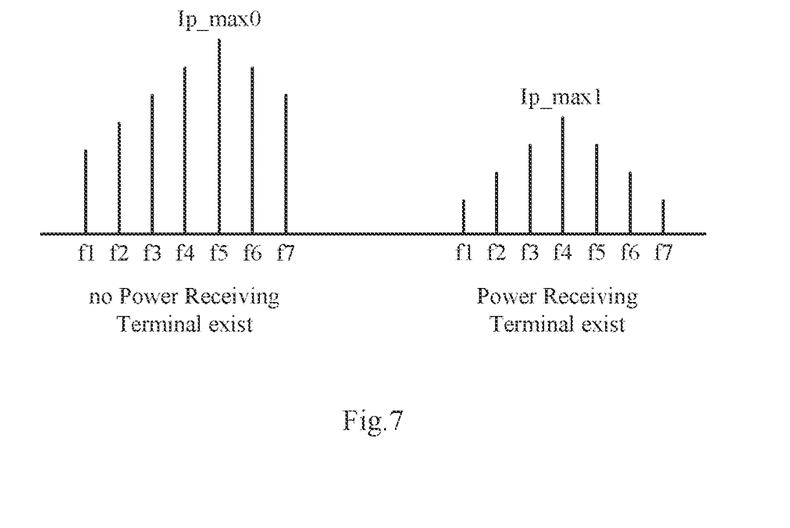
FIG. 7 is a schematic view illustrating the changes of a peak current according to one embodiment of the present disclosure.

FIG. 7 is a schematic view illustrating the changes of a peak current according to one embodiment of the present disclosure. As shown in FIG. 7, in the frequency detection state, no power receiving terminal exists in the alternating magnetic field, and the controller outputs the sweep signals fs to the inverter circuit, wherein the sweep signals fs correspond to the frequencies f1, f2, f3, f4, f5, f6, and f7 which sequentially increase. When the frequency of the sweep signal fs gets close to the inherent frequency of the resonance circuit and resonates with the resonance circuit, the power transmitting coil TX generates the minimum impedance, and can drive the maximum alternating current under the same alternating voltage; that is, the current passing through the power transmitting coil TX reaches the maximum peak value.

To facilitate description, in the present embodiment, as shown in FIG. 7, assuming that the corresponding frequency is f5 when the resonance circuit resonates, then the corresponding peak current is Ip_max0 when the resonance frequency is f5; that is, when no device to be charged exists in the corresponding alternating magnetic field, the generated peak current is Ip_max0.

When the device to be charged exists in the alternating magnetic field, under the influence of the power receiving coil or the magnetic component in the device to be charged, the resonance point of the power transmitting coil is reduced from f5 to f4. Furthermore, the power transmitting coil and the magnetic component of the device to be charged consume power, therefore, the power factor corresponding to the wireless power transmitting coil TX is reduced. Thus, under the same alternating current, the peak current passing through the power transmitting coil TX and corresponding to the resonance point changes from Ip_max0 to Ip_max1, wherein Ip_max1<Ip_max0. Therefore, when the wireless power transmitting terminal is used each time, the controller may be configured to transmit the sweep signal to the inverter circuit, acquires the peak current passing through the power transmitting coil TX during resonance, determines whether the power receiving terminal exists in the alternating magnetic field according to whether the peak current is reduced, and determines the operating state of the wireless power transmitting terminal.

Figure 8:
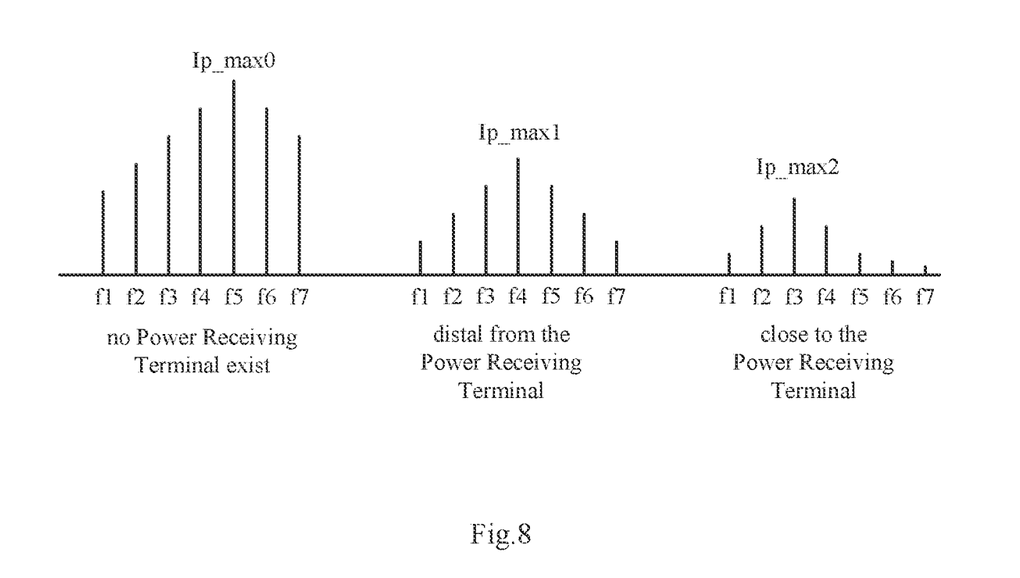
FIG. 8 is a schematic view illustrating the changes of the peak current at different distances between the device to be charged and the power transmitting coil according to one embodiment of the present disclosure.

FIG. 8 is a schematic view illustrating the changes of the peak current at different distances between the device to be charged and the power transmitting coil according to one embodiment of the present disclosure. As shown in FIG. 8, when the device to be charged is distal from the power transmitting coil, the resonance frequency of the resonance circuit is f4, and the peak current corresponding to the resonance frequency f4 is Ip_max1. When the device to be charged is close to the power transmitting coil TX, the resonance frequency of the resonance circuit is reduced to f3, and the peak current corresponding to the resonance frequency f3 changes to Ip_max2, wherein Ip_max2<Ip_max1. Therefore, the distance from the device to be charged to the power transmitting coil TX could be intuitively reflected based on the reduction degree of the peak current of the power transmitting coil TX. When the device to be charged is close to the power transmitting coil TX, a weak magnetic field can realize the charging of the device to be charged; and when the device to be charged is distal from the power transmitting coil TX, a strong magnetic field is required to realize the charging of the device to be charged. Therefore, the distance from the device to be charged to the power transmitting coil could be determined according to the reduction degree of the peak current, and the initial magnetic field intensity of the alternating magnetic field could be determined according to one of the preset relation curves.

Figure 9:
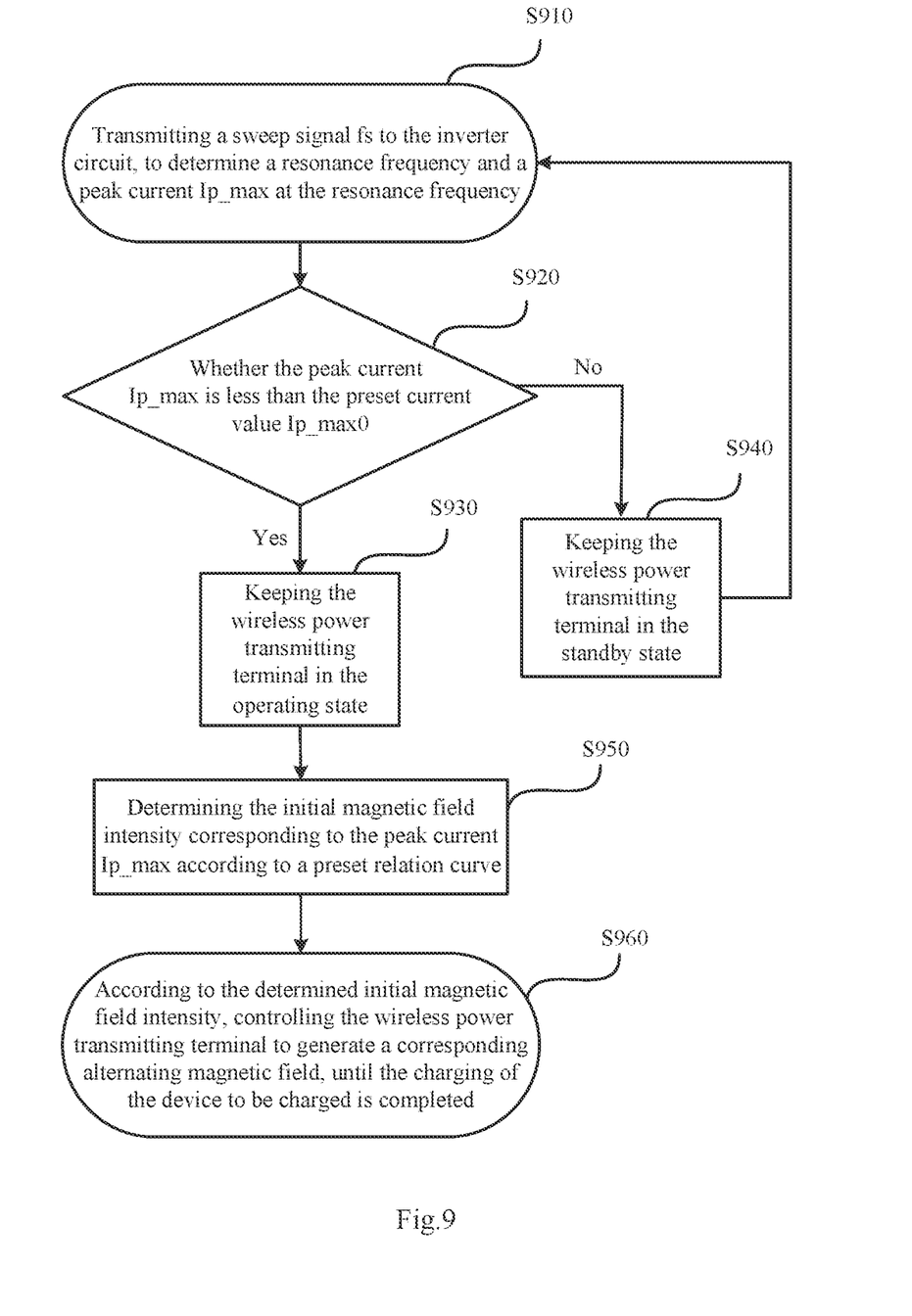
FIG. 9 is a flow chart of a control method of the wireless power transmitting terminal according to one embodiment of the present disclosure.
Figure 10A:
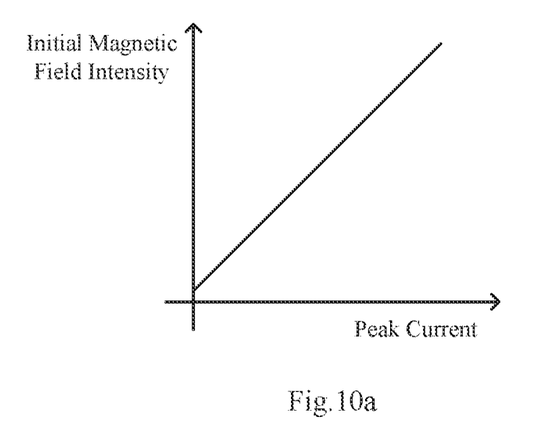
Figure 10B:
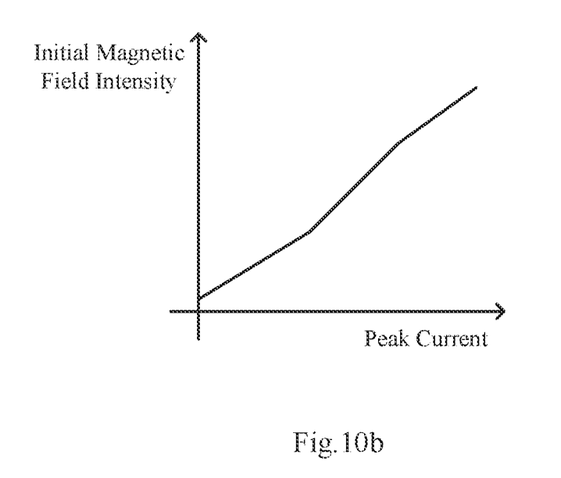
Figure 10C:
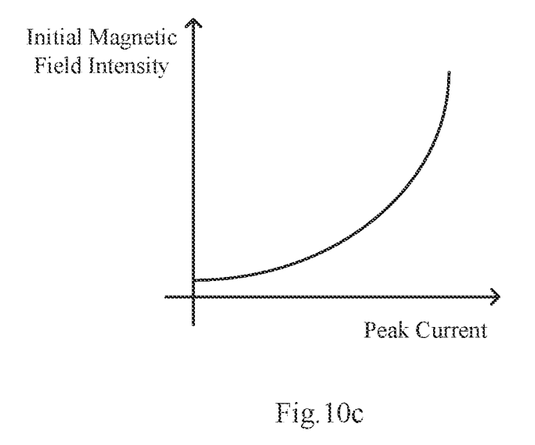
Figure 10D:
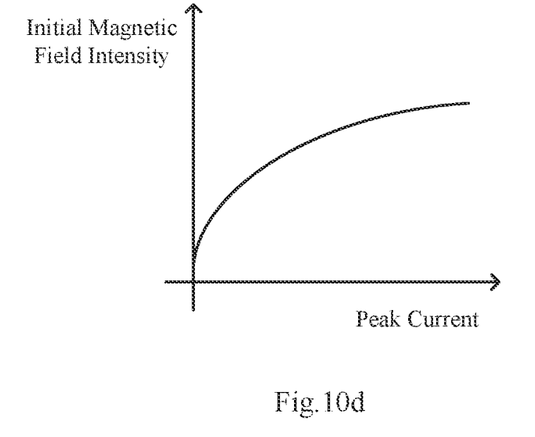

FIG. 9 is a flow chart of a control method of the wireless power transmitting terminal according to one embodiment of the present disclosure. As shown in FIG. 9, the controller is configured to execute the following steps:

In the step S910, transmitting a sweep signal fs to the inverter circuit, to determine a resonance frequency and a peak current Ip_max at the resonance frequency.

In the present embodiment, the sweep signals fs transmitted by the controller include sequentially outputted f1, f2, f3, f4, f5, f6, and f7 the frequencies of which progressively increase.

In the step S920, determining whether the peak current Ip_max is less than the preset current value Ip_max0.

In the step S930, in response to Ip_max<Ip_max0, controlling the wireless power transmitting terminal to enter the operating state, and execute step S950 after the wireless power transmitting terminal enters the operating state.

In the step S940, in response to Ip_max=Ip_max0, controlling the wireless power transmitting terminal to keep in the standby state, and re-executed step S910 when the wireless power transmitting terminal keeps in the standby state.

In the step S950, in response to the wireless power transmitting terminal entering the operating state, determining the initial magnetic field intensity corresponding to the peak current Ip_max according to a preset relation curve.

FIG. 10*a*-10*d* are schematic views of preset relation curves according to some embodiment of the present disclosure. As shown in FIG. 10*a*-10*d*, in practical use, depending on the usage scenario, the initial magnetic field intensity of the wireless power transmitting terminal is determined according to any one of the preset relation curves such as the linear relation curve, the piecewise relation curve, or the nonlinear relation curve. Therefore, by providing a plurality of relation curves, a user can conveniently select an appropriate relation curve; the initial magnetic field intensity, corresponding to the peak current passing through the power transmitting coil TX, according to one of the preset relation curves, is treated as the initial magnetic field intensity of the alternating magnetic field generated by the wireless power transmitting terminal. Thus, the initial magnetic field intensity of the alternating magnetic field may be determined more conveniently and accurately, thereby facilitating the dynamic adjustment of the operating state of the inverter circuit according to the value of the initial magnetic field intensity, and improving the use performance of the wireless power transmitting terminal and the charging efficiency of the device to be charged.

In the step S960, according to the determined initial magnetic field intensity, controlling the wireless power transmitting terminal to generate a corresponding alternating magnetic field, until the charging of the device to be charged is completed.

In the technical solution of the embodiment of the present disclosure, the current passing through the power transmitting coil TX is treated as an electrical parameter to monitor the operating state of the wireless power transmitting terminal; the operating state of the power transmitting terminal could be automatically controlled according to the relationship between the peak current and the preset current value, to realize the charging of the device to be charged. When no power receiving terminal exists in the alternating magnetic field, the power transmitting terminal keeps in the standby state, thereby reducing power consumption, and improving the use efficiency of the power generated by the power transmitting terminal. Furthermore, the distance from the power receiving terminal to the power transmitting coil may be determined according to the reduction degree of the peak current; then, the initial magnetic field intensity of the alternating magnetic field may be dynamically adjusted according to the distance from the power receiving terminal to the power transmitting coil, such that the operating state of the power transmitting coil can satisfy the charging of the devices to be charged at different distances, thereby improving the universality of the wireless power transmitting terminal, reducing extra power consumption, and improving the power use efficiency while ensuring the normal charging of the device to be charged.

In another optional embodiment, the operating state of the wireless power transmitting terminal could be determined by monitoring the change of a voltage at two ends of a compensation capacitor on an output side of the inverter circuit or the change of the electrical parameter on an input side. Therefore, the operating state of the wireless power transmitting terminal could be determined with different methods, thereby improving the use performance of the wireless power transmitting terminal.

With reference to FIG. 3, the change trend of the voltage $V_{Cr}$ at the two ends of the compensation capacitor Cr is consistent with it of the current passing through the power transmitting coil TX; when the operating state of the wireless power transmitting terminal is determined by monitoring the voltage at the two ends of the compensation capacitor on the output side of the inverter circuit, the operating state of the wireless power transmitting terminal could be determined according to whether the maximum peak value of the voltage $V_{Cr}$ is reduced; and after the wireless power transmitting terminal enters the operating state, the initial magnetic field intensity of the alternating magnetic field generated by the wireless power transmitting terminal could be determined according to a peak voltage at the two ends of the changed compensation capacitor Cr. Thus, the alternating magnetic field generated by the wireless power transmitting terminal can satisfy the charging of the devices to be charged at different distances, thereby improving the adaptability of the wireless power transmitting terminal to the device to be charged and the charging efficiency; furthermore, when no device to be charged exists in the alternating magnetic field, the power transmitting terminal keeps in the standby state, thereby reducing power consumption.

Figure 11:
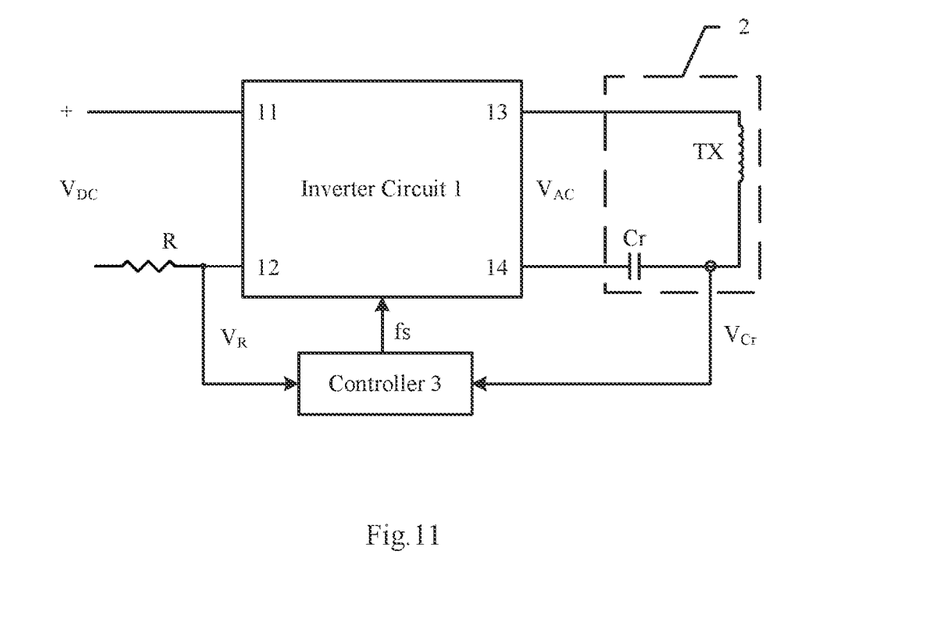
FIG. 11 is another circuit diagram of the wireless power transmitting terminal according to one embodiment of the present disclosure.

Optionally, in the present embodiment, the operating state of the wireless power transmitting terminal can also be determined according to the change of the electrical parameter on the input side. To facilitate the monitoring the electrical parameter on the input side and the determination of the operating state of the wireless power transmitting terminal according to the change of the electrical parameter on the input side, an embodiment of the present disclosure provides another circuit diagram of the wireless power transmitting terminal, and provides a method for determining the operating state of the wireless power transmitting terminal according to the circuit diagram of the wireless power transmitting terminal.

FIG. 11 is another circuit diagram of the wireless power transmitting terminal according to one embodiment of the present disclosure. As shown in FIG. 11, the power transmitting terminal of the present embodiment includes an inverter circuit 1, a resonance circuit 2, a controller 3, and a sampling resistor R, wherein the sampling resistor R is connected between the second input end 12 and the negative electrode of the direct current power supply $V_{DC}$, and is used to sample the voltage $V_R$ on the input side of the inverter circuit 2. The change of the voltage at the two ends of the sampling resistor R is consistent with the change trend of the current passing through the power transmitting coil TX, and therefore can reflect whether the device to be charged exists in the range of the alternating magnetic field generated by the wireless power transmitting terminal, and can reflect the distance from the device to be charged to the power transmitting coil TX. Therefore, the operating state of the wireless power transmitting terminal could be determined according to the change of the peak voltage at the two ends of the sampling resistor R; after the wireless power transmitting terminal enters the operating state, the initial magnetic field intensity of the alternating magnetic field could be determined according to the peak voltage at the two ends of the changed sampling resistor R. Thus, the preset operating state of the wireless power transmitting terminal may be dynamically adjusted according to different parameters, thereby improving the adaptability of the wireless power transmitting terminal to the device to be charged and the charging efficiency.

In the technical solution of the embodiment of the present disclosure, the peak current at the two ends of the sampling resistor R is treated as an electrical parameter to monitor the operating state of the wireless power transmitting terminal, and the operating state of the power transmitting terminal is automatically controlled according to the relationship between the peak voltage and a preset peak voltage value, so as to realize the charging of the device to be charged; when no power receiving terminal exists in the alternating magnetic field, the power transmitting terminal keeps in the standby state, thereby reducing power consumption, and improving the use efficiency of the power generated by the power transmitting terminal. Furthermore, according to the reduction degree of the peak voltage, the distance from the power receiving terminal to the power transmitting coil could be determined, according to which the initial magnetic field intensity of the alternating magnetic field may be dynamically adjusted, such that the operating state of the power transmitting coil may satisfy the charging of the devices to be charged at different distances. Thus, the universality of the wireless power transmitting terminal may be improved, extra power consumption may be reduced, and the power use efficiency may be improved while ensuring the normal charging of the device to be charged.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is intended that the scope of the present disclosure be defined by the claims appended hereto and their equivalents.

We claim:

1. A wireless power transmitting terminal, comprising:
   an inverter circuit, configured to receive a direct current and output an alternating current;
   a resonance circuit, connected to the inverter circuit, receiving the alternating current outputted by the inverter circuit to generate an alternating magnetic field; and
   a controller, configured to perform:
   in a frequency detection state, controlling the alternating current of the inverter circuit to switch between different candidate frequencies to determine a resonance frequency, wherein at the resonance frequency, an electrical parameter of the alternating current has a maximum peak value;
   in response to the maximum peak value in a preset current value range, controlling the wireless power transmitting terminal to keep in a standby state;
   in response to the maximum peak value less than a minimum value of the present current value range, controlling the wireless power transmitting terminal to enter an operating state; and
   in response to the wireless power transmitting terminal entering the operating state, determining, according to a preset relation curve and the maximum peak value, an initial magnetic field intensity, wherein the preset relation curve is a relation curve, obtained under a test condition, between the maximum peak value passing through a power transmitting coil and the initial magnetic field intensity of the wireless power transmitting terminal;
   wherein, in the standby state the controller is configured to switch to the frequency detection state periodically.

2. The wireless power transmitting terminal of claim 1, wherein the controller is further configured to perform:
   determining, according to the maximum peak value, the initial magnetic field intensity after the wireless power transmitting terminal enters the operating state; and
   controlling the operating state of the inverter to satisfy the initial magnetic field intensity;
   wherein, the initial magnetic field intensity matches a distance from the power receiving terminal to the power transmitting coil.

3. The wireless power transmitting terminal of claim 2, wherein the electrical parameter of the alternating current is a current.

4. The wireless power transmitting terminal of claim 3, wherein the preset relation curve is one of a linear relation curve, a piecewise linear relation curve, and a nonlinear relation curve.

5. The wireless power transmitting terminal of claim 3, wherein the controller is further configured to perform:
   in response to a peak current less than a preset current value, controlling the wireless power transmitting terminal to enter the operating state; and
   in response to a peak current equal to the preset current value, controlling the wireless power transmitting terminal to keep in a standby state.

6. The wireless power transmitting terminal of claim 3, wherein the controller is further configured to perform:
   controlling the alternating current of the inverter circuit to switch between candidate frequencies corresponding to sweep signals, to determine a resonance frequency and a peak current corresponding to the resonance frequency.

7. The wireless power transmitting terminal of claim 2, wherein the resonance circuit comprises:
   a power transmitting coil; and
   a compensation capacitor, connected to the power transmitting coil in series;
   wherein the electrical parameter of the alternating current is a voltage at the two ends of the compensation capacitor.

8. A control method for controlling a wireless power transmitting terminal comprising an inverter circuit and a resonance circuit, wherein the method comprises:
   in a frequency detection state, controlling an alternating current of the inverter circuit to switch between different candidate frequencies to determine a resonance frequency, wherein at the resonance frequency, an electrical parameter of the alternating current has a maximum peak value;
   in response to the maximum peak value in a preset current value range, controlling the wireless power transmitting terminal to keep in a standby state;
   in response to the maximum peak value less than a minimum value of the present current value range, controlling the wireless power transmitting terminal to enter an operating state; and
   in response to the wireless power transmitting terminal entering the operating state, determining, according to a preset relation curve and the maximum peak value, an initial magnetic field intensity, wherein the preset relation curve is a relation curve, obtained under a test condition, between the maximum peak value passing through a power transmitting coil and the initial magnetic field intensity of the wireless power transmitting terminal;
   wherein, in the standby state it is switched to the frequency detection state periodically.

9. The method of claim 8, further comprising:
   determining, according to the maximum peak value, the initial magnetic field intensity after the wireless power transmitting terminal enters the operating state; and
   controlling the operating state of the inverter to satisfy the initial magnetic field intensity;
   wherein, the initial magnetic field intensity matches a distance from the power receiving terminal to the power transmitting coil.

10. The method of claim 9, wherein the electrical parameter of the alternating current is a current.

11. The wireless power transmitting terminal of claim 2, further comprising:
    a sampling resistor, configured to sample the voltage on the input side of the inverter circuit;

wherein the electrical parameter of the alternating current is a voltage at the two ends of the sampling resistor.

* * * * *